United States Patent [19]

Shirley et al.

[11] 3,809,060

[45] May 7, 1974

[54] MOBILE BURNING APPARATUS FOR AGRICULTURAL USE

[75] Inventors: Howard E. Shirley, Eugene; Jackie L. Jensen, La Grande, both of Oreg.

[73] Assignee: Turbo Cycle Company, Inc., Eugene, Oreg.

[22] Filed: Mar. 2, 1973

[21] Appl. No.: 337,300

[52] U.S. Cl. ........................................ 126/271.2 C
[51] Int. Cl. .......................................... F23c 5/00
[58] Field of Search... 126/271.1, 271.2 A, 271.2 C, 126/271.2 R, 271.3

[56] References Cited
UNITED STATES PATENTS

| | | | |
|---|---|---|---|
| 3,382,864 | 5/1968 | Fannin et al. | 126/271.2 A |
| 1,571,883 | 2/1926 | Belanger | 126/271.2 A |
| 1,112,241 | 9/1914 | Ward | 126/271.2 A |
| 1,322,459 | 11/1919 | Mattern | 126/271.2 A |
| 1,458,070 | 6/1923 | Long et al. | 126/271.2 A |

*Primary Examiner*—William F. O'Dea
*Assistant Examiner*—Peter D. Ferguson
*Attorney, Agent, or Firm*—James D. Givnan, Jr.

[57] ABSTRACT

A wheel supported apparatus with a battery of gas fired burners discharging into ground contact for igniting vegetable matter thereon. Air is supplied to the interior of the closed vehicle framework by conduits in close proximity to and discharging onto the ground. A blower delivers a constant airflow to the conduits via hollow framework members. An exhaust fan discharges through a detachable stack resulting in a negative pressure within the apparatus. Insulated walls are further protected against heat by an airflow therethrough resulting from the negative internal pressure. An internal barrier within the apparatus routes the combustion flow along a reverse path with air being added during such combustion, through said barrier.

17 Claims, 13 Drawing Figures

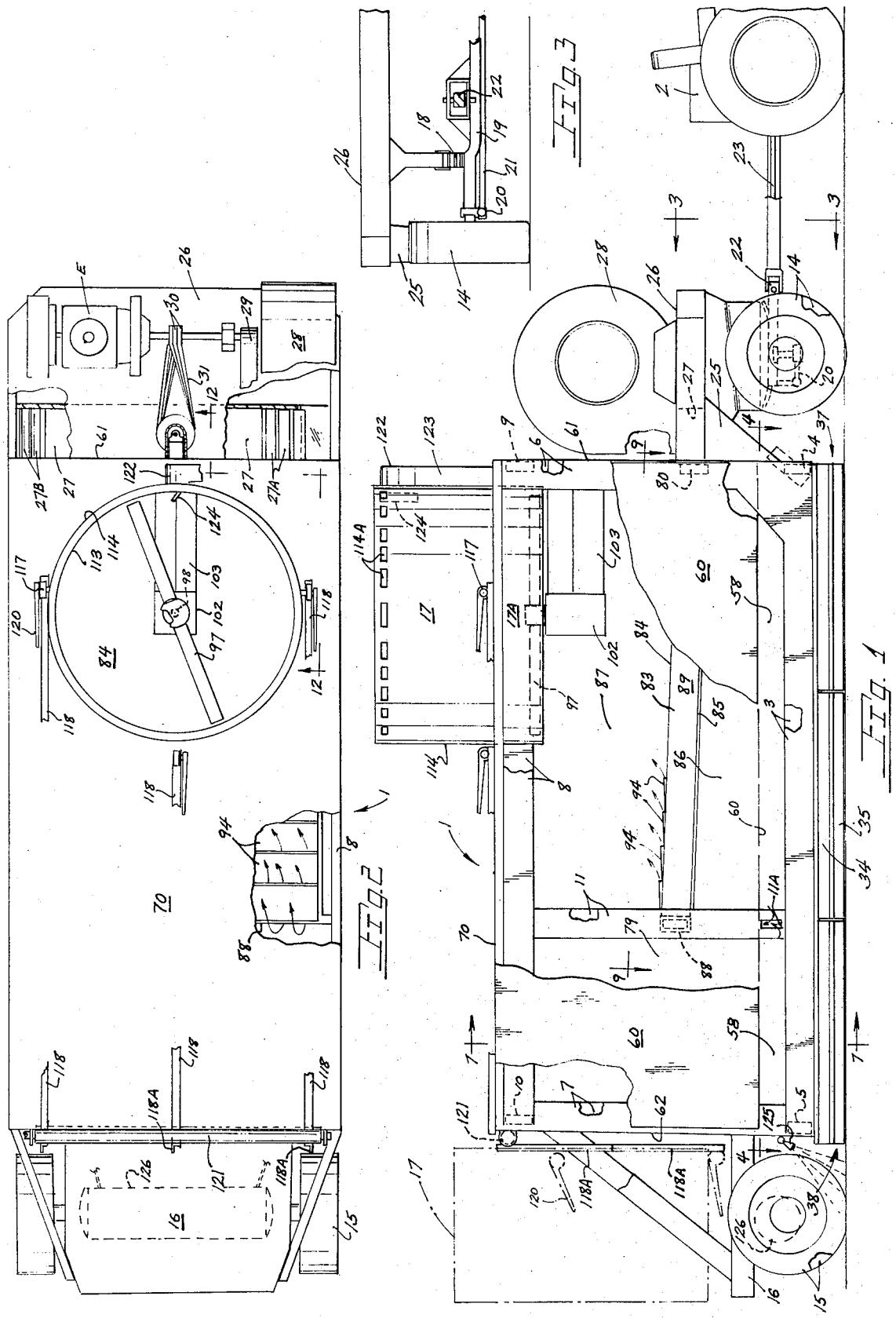

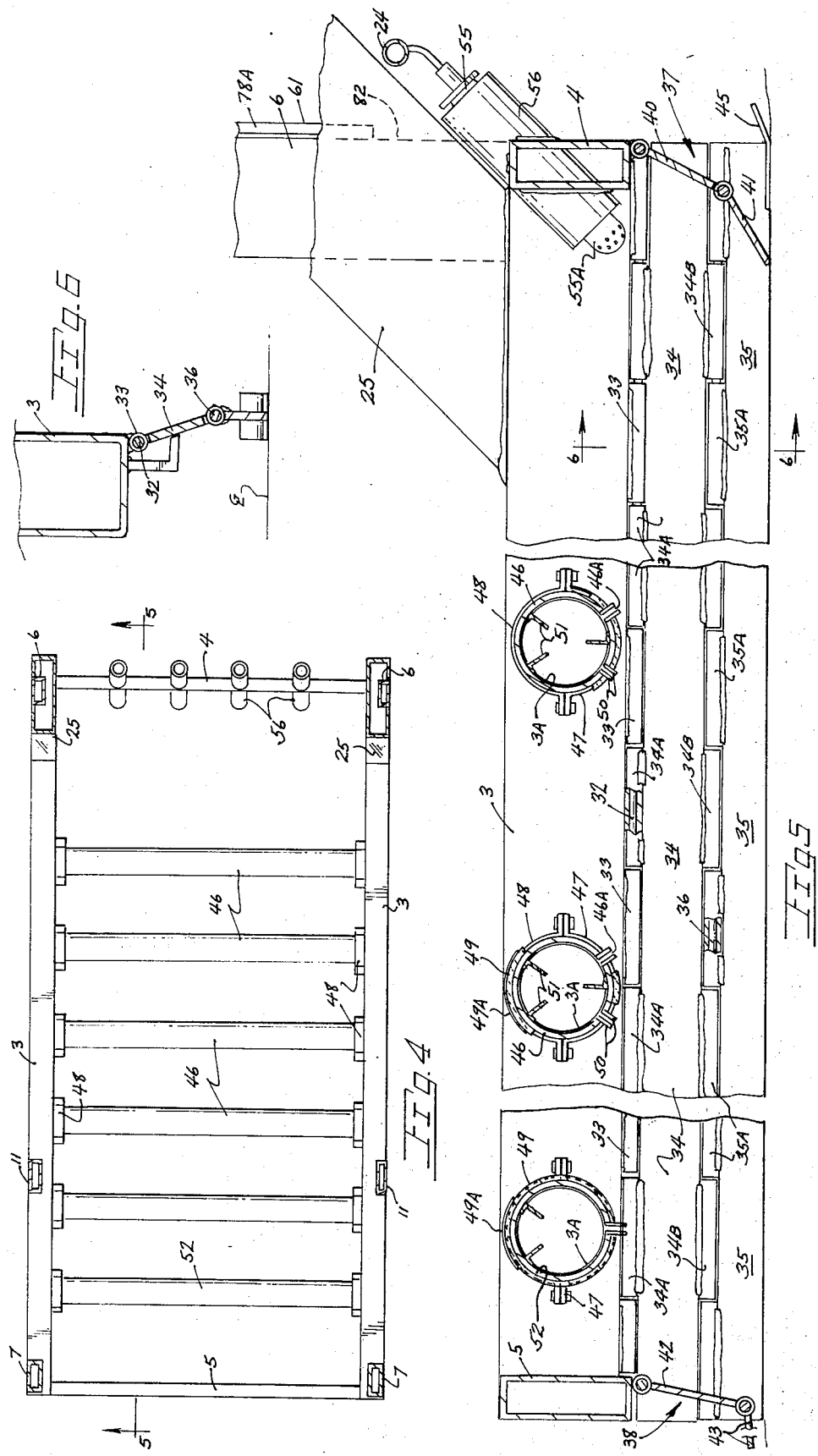

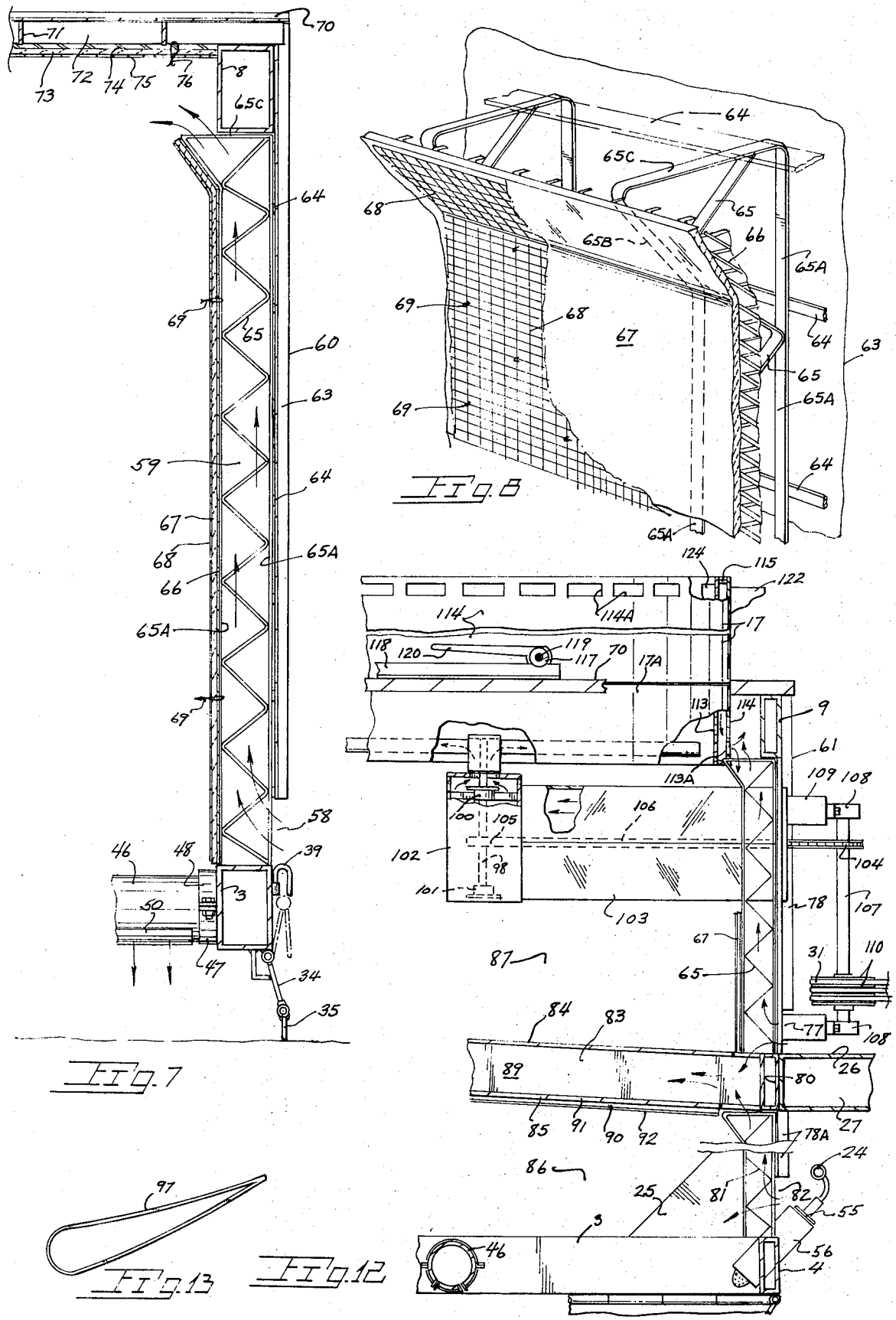

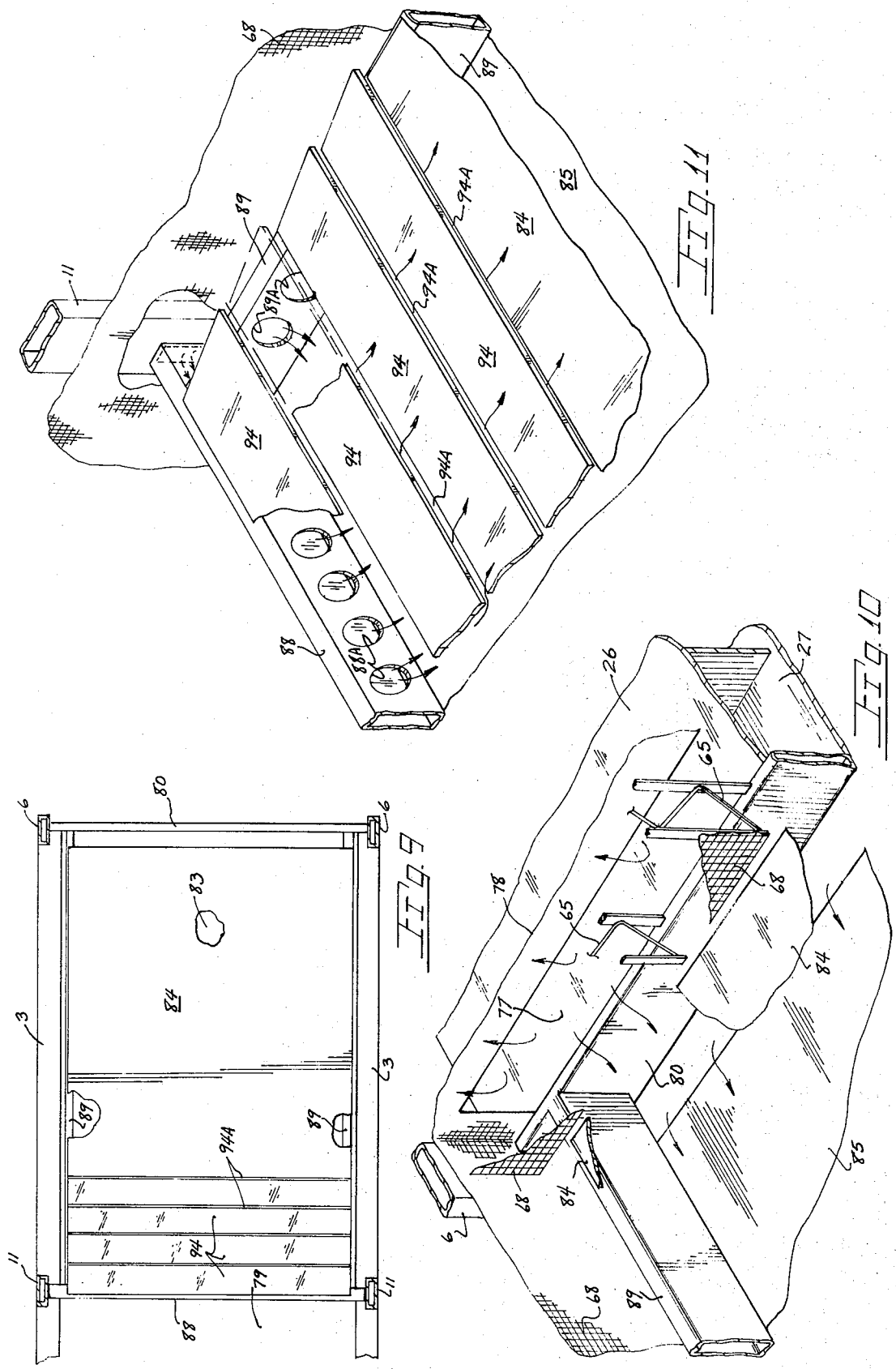

3,809,060

MOBILE BURNING APPARATUS FOR AGRICULTURAL USE

BACKGROUND OF THE INVENTION

The present invention relates to a mobile burning apparatus and more particularly to one specifically adapted for progressive burning of a field for agricultural purposes.

It is well accepted that the post harvest burning of certain field crops is highly advantageous to subsequent crops. For examples, open field burning is a common practice in some western states each fall season to kill off substantially all undesirable organisms which otherwise would lie dormant through the winter and infect and damage the following crop. Such burning destroys fungus, insect eggs and larvae as well as weeds and other undesired plant life.

While the desirable effects of open field burning are readily apparent to those in agriculture, equally or more apparent to inhabitants of nearby population centers is the contribution of such burning to existing air pollution problems. Air pollution resulting from such burning is considered severe enough to result in certain state legislatures enacting restrictions against all open field burning past a set date. One particular agricultural crop, grass seed, is threatened by such a ban since it is particularly susceptible to insects and other organisms now presently controlled by burning. Chemical or mechanical treating of such a crop has not been successful to date. While field burning equipment has been tried on an experimental basis, it has not been successful from the aspect of operating at an acceptable low emission level nor at a rate practical for field operations.

A readily apparent problem results from the temperatures required for field burning. To sanitize the ground surface layer below rye grass stubble, for example, temperatures within the apparatus must approach 900° F.. Accordingly, the chamber within which burning takes place must be adequately insulated to protect apparatus structural members from heat damage. Insulation used must be capable of withstanding impacts incurred by reason of apparatus traveling over rough, irregular field surfaces.

Another problem resides in strictly confining burning of the rye grass stubble to an area within the moving apparatus with no escape of burning embers to cause the starting of open fires.

A practical requirement for a field burning apparatus is that it be capable of traveling from a field burning site to a second site along existing roadways and accordingly must not exceed applicable height and width limitations for such travel.

SUMMARY OF THE INVENTION

The present invention is embodied within an apparatus which may be termed a mobile field burner for efficiently treating the ground to rid same or undesirable plant and insect life as well as to enhance the ground fertility.

The apparatus includes a wheel-supported framework adapted for travel about the field being treated. A series of gas burners are located forwardly and ignite the stubble while flame treating the ground. Transversely extending air conduits spaced along the apparatus located somewhat above the ground surface provide combustion-supporting air from a blower carried by the apparatus with an airflow being delivered to the above-mentioned air conduits via apparatus frame members. The apparatus defines a combustion chamber immediately above the ground and an exhaust chamber for the burning gases. An internal partition or barrier of the apparatus partially defines the two areas while also serving to direct a supply of air into the exhaust chamber primarily for cooling purposes. Further defining the combustion chamber and depending from the apparatus framework are hinged skirts which flex over varying terrain to confine combustion within the apparatus and seal the lower perimeter of the apparatus.

Airflow through the apparatus results from a below atmospheric or negative pressure within the apparatus by reason of a fan exhausting air from same. Importantly, a portion of the airflow drawn into the machine is via the wall structure, the air acting to dissipate heat from the wall structure. A stack is additionally cooled by an incoming airflow and is movable on the apparatus for reducing the overall height of same for road travel.

Objects of the present field burning apparatus include the provision of an apparatus capable of burning field crop stubble at a practical rate during travel over same yet having an acceptable low emission level; an apparatus for travel to and from burning sites along public roads under its own power; an apparatus including internally reinforced air conduits extending intermediate frame members of the apparatus for delivery of combustion supporting air; an apparatus wherein some of its frame members serve dually to carry an airflow; an apparatus including a skirt structure efficiently confining combustion chamber heat; an apparatus including wall structure through which flows a vertical flow of cooling air to protect said wall structure; an apparatus having an internal barrier past which the products of combustion must flow in a circuitous path with the barrier serving to reflect heat to the ground surface; an apparatus wherein said barrier serves as a plenum for a cooling flow of air for addition to the burning particles prior to their discharge; an apparatus having a removable stack for relocation of the stack on the machine prior to roadway travel if necessary; and an apparatus having a removable air cooled stack with means for collecting heavy particulate and returning same to the apparatus interior.

BRIEF DESCRIPTION OF THE DRAWINGS

In the accompanying drawings:

FIG. 1 is a side elevational view of the burning apparatus of the present invention with wall structure broken away for purposes of illustration;

FIG. 2 is a plan view of FIG. 1 with fragments broken away for purposes of illustration;

FIG. 3 is a vertical elevation of undercarriage details taken along line 3—3 of FIG. 1;

FIG. 4 is a horizontal sectional view taken along line 4—4 of FIG. 1 showing details of the apparatus lower framework, air conduits and burner mounting;

FIG. 5 is a vertical section taken along line 5—5 of FIG. 4 additionally showing details of air conduits and skirt means carried by the framework;

FIG. 6 is a vertical section taken along line 6—6 of FIG. 5 showing additional skirt details;

FIG. 7 is a vertical section taken along line 7—7 of FIG. 1 showing details of typical wall construction;

FIG. 8 is a perspective view looking downwardly upon a fragment of wall construction;

FIG. 9 is a horizontal section taken along line 9—9 of FIG. 1 showing a barrier within the apparatus;

FIG. 10 is a perspective view of a forward portion of the barrier within the apparatus and associated framework structure;

FIG. 11 is a view similar to FIG. 10 showing the rearward, vented portion of the barrier;

FIG. 12 is a sectional elevational view taken approximately along irregular line 12—12 of FIG. 2; and FIG. 13 is an end view of a blade of the apparatus exhaust fan.

DETAILED DESCRIPTION OF THE PREFERRED EMBODIMENT

With continuing reference to the accompanying drawings wherein applied reference numerals indicate parts similarly identified in the following specification, the reference numeral 1 indicates generally the mobile field burning apparatus shown with an external source of motive power in the form of a tractor at 2. While shown as having a separate motive source, such does not preclude the embodiment of the present invention in a self-powered vehicle.

The apparatus comprises a welded steel framework of bow-like configuration including a pair of lower longitudinal members 3, each being in the nature of a box beam and interconnected at their ends by front and rear crossmembers 4 and 5 with the beam members 3 serving additionally to convey and airflow as later described. Extending upwardly from the forward ends of the channel members 3 are a pair of upright frame members 6, while similar rearward frame members are indicated at 7. A perimeter frame interconnects the upper ends of frame members 6 and 7 and includes upper longitudinal members 8 and front and rear upper crossmembers 9 and 10. The welded steel framework additionally includes a pair of vertical box beams 11 extending intermediate upper and lower longitudinal members 3 and 8.

Supporting the forward end of the apparatus are a pair of steerable wheels at 14, while wheels at 15 support the trailing end. A rearward extending deck 16 carries the wheel suspension components for wheels 15 and additionally serves as a platform receiving a removable stack shown in broken lines at 17 in its travel position.

An undercarriage for front wheels 14 includes a spring suspension 18 (FIG. 3) upon which an axle 19 is mounted. Steering arms as at 20 are actuated by a tie rod 21 extending the length of the axle with the tie rod being pivotally coupled to a swingably mounted tongue 22. Accordingly, steering movement is imparted to the front wheels 14 in compliance with lateral displacement of the forward end of tongue 22 as imparted by the towing vehicle. The maneuverability of the apparatus is accordingly enhanced to permit short radius turns advantageous in field burning operations as well as in rural roadway travel from field to field. The towing vehicle 2 is shown as a farm tractor of the larger class which is equipped with tanks (not shown) for propane or other fuel burned by the apparatus. A fuel line 23 from said tanks is in communication with each of the burners, later described, by means of a manifold 24 (FIG. 5). If desired the tractor may be further equipped with a pair of rear mounted shredders for the forming of a fire barrier by churning of stubble and earthen crust along spaced apart paths common to the two sides of the apparatus.

Projecting forwardly from the forward frame member 6 is an engine and blower supporting platform 26 which internally defines an air duct 27 extending transversely thereof to receive a portion of the output of a centrifugal blower 28. A suitable blower is rated at 40,000 CFM at seven inches water column. In communication with the blower and extending downwardly and rearwardly from opposite sides of platform 26 are a pair of ducts 25 each terminating in communication with the forward end of frame members 3. The frame members, as earlier mentioned, are of box beam construction to carry the airflow rearwardly, ultimately distributing same to transversely disposed air conduits later described for exhausting within the apparatus combustion chamber also later described. With attention again to the transverse air duct 27 within platform 26, said duct includes arcuate louvers 27A to initially deflect a portion of the blower discharge horizontally along duct 27 while louvers at 27B at the duct end serve to direct the horizontal airflow downwardly through inclined duct 25.

For powering blower 28 an internal combustion engine at E is platform mounted and drives the blower through a multiple belt reduction drive suitably housed at 29 (FIG. 2). The engine output shaft also carries multiple sheaves at 30 for driving belts 31 of a fan drive latter described.

Hingedly depending from each lower side frame member 3 are skirt-like structures jointly confining combustion within the interior of the apparatus while preventing the entry of air therepast. Similar fore and aft skirt structures are later described. A typical side skirt arrangement as best viewed in FIGS. 5 through 7 includes an elongate pivot pin 32 secured at intervals to said frame member by frame welded sleeves 33 while intervening pin segments support, in a hinged manner, sleeves 34A carrying a first or upper skirt plate 34. A second skirt plate 35, with sleeves 35A, is supported in a similar manner by an elongate pin 36 carried by sleeves 34B on the upper skirt plate. The two skirt plates are coterminous at points therealong as seen in FIG. 1 to enable the lowermost edge of plate 35 to closely follow the irregular ground contour.

Further confining combustion are front and rear skirt structures generally at 37 and rearwardly at 38 with the former including a unitary skirt plate 40 swingably attached to frame member 4 by a sleeve and rod arrangement of the type earlier described with plate 40 in turn serving to swingably mount a plurality of contiguous secondary plates 41 which trail in ground contact. Rear skirt structure 38 also comprises a plate 42 hingedly carried along the length of rear frame member 5 swingably trailing a series of contiguous secondary plates at 43 which independently move in a hinged manner about a common rod 44 carried by plate 42. Secondary plates 43 trail substantially parallel to the ground surface and serve to smother the burning stubble to prevent after fires. Further, the front and rear skirt structures act as heat barriers to protect the tires from excessive temperatures. Skid plates at 45 prevent the lower leading corners of the skirt plates from digging into the ground. In FIG. 7, a typical holder at 39 is shown for retention of a skirt structure in a raised or travel position. The holders are U-shaped and slidably mounted to engage a raised skirt structure.

With reference to FIGS. 4 and 5 wherein transversely disposed air conduits are best illustrated, the conduits at 46 extend transversely between the lower frame members 3 with the conduits serving to provide combustion supporting air to the burning stubble. Said conduits are end mounted within semi-circular supports 47 in welded attachment to frame members 3. A clamp 48 of like shape is bolted to each support 47 to secure the conduit end while permitting rotational adjustment of each conduit. Each frame member 3 is apertured at 3A which apertures are in register with the inner periphery of each conduit 46 for delivery of pressurized air to each conduit. Extending along each conduit 46 are multiple slot-like nozzles 46A formed by spaced-apart bars 50 welded at their upper edges to their respective conduits. The nozzles so formed exhaust downwardly both ahead of and behind the axis of each conduit to efficiently support ground level combustion. Internally disposed within each conduit are stiffeners 51 spot welded along the inner wall of each conduit. Stiffeners 51 have radially disposed flanges to dissipate conduit heat to the passing airflow to protect the conduit from excessive temperatures. With the conduit ends in open communication with the interiors of the longitudinal frame members 3, the blower originating flow of air is evenly dispersed to the burning stubble initially ignited by the later described burners. The rearwardmost conduit, indicated at 52, is supported in an identical manner as conduits 46 which the only difference residing in the single nozzle of conduit 52 being directed downwardly for purposes of retarding burning rearwardly of the conduit. For protection of conduits 46 the same are wrapped in refractory material 49 of the type later described in connection with the wall structure which is secured by stainless steel mesh 49A.

For igniting the ground cover a battery of propane burners 55 is provided, the burners spaced across the front frame member 4. Burner sleeves at 56 are welded in place within oval-shaped aperatures formed within frfame member 4. Each burner, in the present embodiment, has a rated capacity of approximately 350,000 BTU's with one satisfactory type of burner known in the art as a model B-5 manufactured by the Ronson Corporation.

To destroy larvae of the type found on rye grass stubble the ground surface and immediate area must be heated to within a temperature range of from 400° F. to 900° F. for a period of at least 3 seconds. To accomplish this the nozzles 55A of burners 55 are spaced approximately twelve inches above the ground surface and produce a merging flame pattern reaching to the ground surface. The resultant rapid heating of the upper layer of the ground produces an additional benefit over and above the destruction of larvae and weeds by reason of the ground's productivity being increased over untreated soil. Each burner 55 includes a pilot burner (not shown) in the conventional manner.

With joint attention to FIGS. 7 and 8 wherein a vertical section of typical wall construction is shown, such construction permits a cooling airflow to pass upwardly intermediate certain wall components for discharge into the apparatus. The following description of one side wall 60 is equally applicable to the remaining side wall and to the front and rear wall 61 and 62, all of same serving to enclose the apparatus framework earlier described. Each of the wall structures defines an open area 58 through which ambient air enters for passage upwardly through the wall. Corrugated metal sheathing 63 provides the exterior covering of each wall, the sheathing being affixed by riveting or the like to a lattice type support 64 which in turn is carried by vertically disposed, spaced apart truss assemblies 65. The truss assemblies each include a Z-shaped truss member welded to chordal members 65 A. Overlying the innermost chordal member of each truss and wired thereto is a sheet of expanded metal mesh 66 extending the length and height of the wall structure 60. Overlying the expanded metal mesh 66 is a thickness of refractory material 67 in sheet form. A one-half inch layer or layers of an artificial ceramic fiber product such as KAOWOOL manufactured by Babcock and Wilcox Company from kaolin is one such suitable material. Outwardly of the refractory layer 67 and retaining same in place against expanded metal mesh 66 is a stainless steel mesh 68 with clips 69 extending therethrough. Accordingly a hollow wall is formed with an upright open area 59 therein provided for by the applied arrows of FIG. 7. The upper ends of trusses 65 are inwardly inclined at 65B as is the attached wall structure thereon to provide an outlet for the cooling airflow into the apparatus interior. For regulating the airflow through the wall structures to effect different degrees of cooling, elongate plates 64 may be tacked by welds to the horizontal segment 65C of the trusses. The expanded metal mesh 66 of the wall structures may be dispensed with in high temperature areas of the wall by a solid sheet of metal to prevent inward airflow.

A roof structure 70 in FIG. 7 rests upon the upper side frame members 8 and fore and aft members 9 and 10 and comprises a latticework of interconnected longitudinal and transverse bars 71–72. Refractory sheets at 73 are secured to said latticework by means of expanded metal mesh 74 and stainless steel mesh 75 held together by inserted clips 76.

While the side walls 60 and rear wall 62 are substantially of the same vertical dimension, the front wall 61 is of somewhat different construction but retains the spaced-apart truss assemblies 65 and associated insulative wall components earlier described. One such assembly being typically shown in FIG. 12. With attention also to FIG. 12, the truss assemblies 65 and said wall components of the front wall are of lesser length than those of the side and rear walls by reason of the former terminating at their lower ends coplanar with the upper surface of engine platform 26. An inlet 77 for ambient air is provided by the spaced lower end of metal sheathing at 78 from said platform surface. Supporting the truss assemblies is a crossmember 80 extending intermediate the forward upright frame members 6. The front wall structure 61 below engine platform 26 is also partially closed off by sheathing 78A (FIG. 12) supported by truncated truss assemblies 81 which are of reduced height and supported by lower crossmember 4 of the frame. Inward of both the upper and lower truss assemblies 65 and 81 of the front wall structure are insulative combinations of expanded metal mesh, refractory material and stainless steel mesh as earlier described. The interior insulative combination supported by the lower truncated truss assemblies 81 terminates in spaced relationship above the lower crossmember 4 to permit passage of ambient air through an air inlet 82 directly into the apparatus interior adjacent the burners 55.

With attention to FIGS. 9–11, a barrier at 83 is of hollow construction having top and bottom wall surfaces 84–85 separating the interior of the apparatus into a subjacent combustion chamber 86 and an exhaust chamber 87 thereabove. The open area rearwardly of said barrier constitutes a transfer zone 79 (FIG. 1). The barrier structure provides a heat barrier for the combustion chamber assuring efficient retention of desired temperatures within the last mentioned chamber while additionally serving to provide an upward flow of ambient air to exhaust chamber 87 primarily for cooling purposes. Previously mentioned cross-member 80 defines the forward end of barrier 83 while a second crosswise member at 88, apertured at 88A, closes the rearward end. A pair of box beams 89 extend fore and aft intermediate crossmembers 80 and 88 while additional longitudinal members complete the barrier. The bottom wall of the barrier comprises a refractory layer 90 of the earlier described material (FIG. 12) and with oppositely disposed sheets of expanded metal mesh and stainless steel mesh at 91 and 92 securing said layer 90 in place. The upper surface 84 of barrier 83 is closed by planar material extending rearwardly past the barriers midpoint with the rearward portion of the barrier having transversely arranged deflectors 94 which are offset from one another to define slotted openings 94A through which air is discharged. The airflow discharged through said openings is pulled in openings 11A in frame members 11 and passes through openings 88A and 89A in the barrier frame members. Additional air enters transverse openings in the barriers forward wall surfaces as seen in FIG. 10.

The barrier is forwardly inclined approximately three degrees to provide an expanding burning chamber 86. Burning particulate moves rearwardly below the barrier wall 85 to transfer zone 79 wherein the burning particulate flows in an upwardly curving, reverse course over the barrier end and forwardly into the expanding exhaust chamber 87. Heavy burning particles settle downwardly from the transfer zone 79 while burning airborne particles entering the exhaust area or chamber 87 are supplied with an airflow via the slotted openings 94A. The incoming flow importantly cools the air within chamber 87 prior to exhaust. With the airflow being in a forward direction through exhaust chamber 87, the inclined barrier provides an exhaust area progressively expanding in volume from rear to front.

A negative or below atmospheric pressure exists within the combustion and exhaust chambers 86 and 87 as well as in transfer zone 79 of the apparatus by reason of an exhaust fan 97, as best viewed in FIG. 12, disposed adjacent the lower end of stack 17. A fan shaft 98 is journalled within bearings 100–101 which are isolated within an enclosure 102. A tunnel of welded plate construction at 103 houses a length of roller chain 106 entrained about driving and driven sprockets 104–105, the latter keyed to shaft 98. Driving sprocket 104 is carried by an upright shaft 107 journalled exteriorly of the machines forward wall 61 within bearings 108. Each bearing 108 is mounted to the front wall 61 of the machine by means of mounts 109 spacing shaft 107 outwardly a suitable distance to receive multiple sheaves 110 driven by V-belts 31. The sheaves 30 on the motor output shaft in conjunction with V-belts 31, sheaves 110 and roller chain drive for fan shaft 98 constitute a reduction drive for the fan to drive same at 1,200–1,500 RPM. The fan 97 comprises a pair of hollow blades each having a cross section of inverted airfoil shape with a chord dimension of 10 inches or so and a combined overall length of approximately 8 feet. A flow of air through tunnel 103, enclosure 102 and upward through a hollow hub 111 into blades 97 cools the latter during centrifugal flow through the blades. Alteration of fan 97, as by the addition of blades or change in the blade pitch will obviously vary the negative pressure within the apparatus.

The stack 17 as earlier mentioned is removable from its operative position of FIG. 12 to a travel position on the rear deck 16 of the machine for vertical clearance purposes. In its operative position it is in registration with a permanent stack lower section at 17A secured to and depending from the roof structure latticework.

The upper or removable stack portion at 17 along with stack section 17A are of double walled sheet metal construction with inner and outer walls 113–114. Openings at 114A in the stack upper end admit a stack cooling flow of air interiorly of the stack walls which enters the stack via openings 113A in the inner wall. The walls are held in spaced relationship by interposed circular trusses 115 in both the upper and lower stack sections. A reverse flow of air passes downwardly between the stack walls to cool same and merges with an upward flow of air adjacent the lower periphery of the stack for exhausting by fan 97.

For repositioning the stack section 17 the same is supported on rollers 117 entrained on three lengthwise extending rails 118. The rollers are journalled upon spindles 119 which act as fulcrums for raising of stack 17 by cam actuating levers 120. The stack accordingly may be elevated somewhat above stack section 17A for roller supported travel rearwardly. Stack repositioning is necessary only when road travel past obstructions is anticipated. The lightweight stack 17 may be manually moved rearwardly to a position above the rear deck 16 on three rail extensions 118A all swingably mounted on a torque tube 121. A screw jack (not shown) is temporarily supported in place on deck 16 and in cooperation with a torque tube lever (not shown) horizontally positions the three rail extensions into horizontal alignment with their respective rails 118 to receive stack 17. Torque tube 121 with its three rail extensions 118A is then lowered to the broken line position of FIG. 1 by lowering of the jack.

As viewed in FIGS. 1 and 2, located on the outer wall 114 of stack 17 is a housing 122 defining therewithin a collection chamber for particulate which by reason of its weight has moved radially into impinging travel about inner stack wall 113. Openings through the stack walls permit discharge of the particulate into housing 122, the latter having a downwardly curved chute 123 for return of the particulate into the interior of the apparatus to permit continued combustion of same. For purposes of deflecting the particulate into the chamber defined by housing 122, an inwardly projecting lip 124 is provided on the inner wall 113 of the stack.

For the purpose of insuring against stubble fires exteriorly of the enclosed framework a pair of nozzles as at 125 are located to spray outboard of the rear wheels which for cooling purposes may travel upon the wetted strip of ground. A water tank 126 is in communication with a pump (not shown) for delivery to the nozzles. The shredders earlier mentioned in connection with tractor 2 may be carried instead on the apparatus framework to achieve the same purposes. In such instances the shredders are suspended in a manner permitting their elevation for road travel.

The operation of the present apparatus is believed largely apparent from the foregoing description. The speed of travel during field burning is approximately 5 miles per hour depending on the stubble height, the weather and ground conditions.

While we have shown but one embodiment of the invention, it will be apparent to those skilled in the art that the invention may be embodied still otherwise without departing from the spirit and scope of the invention is hereinafter claimed.

Having thus described the invention, what is desired to be claimed and secured under a Letters Patent is:

1. A mobile burning apparatus for the application of heat to the ground surface and material immediately thereabove such as vegetable matter, said apparatus comprising,
  a framework of box-like configuration supported upon wheels,
  skirt means depending from the framework to confine combustion therewithin while restricting the entry of ambient air into the enclosed framework,
  wall and roof structures enclosing the framework, said wall structures having open areas therein in communication with both the atmosphere and the interior of the apparatus for the passage of ambient air for wall cooling purposes, said wall and roof structures including refractory protective material,
  multiple burners supported by the framework,
  air conduits carried by the mobile framework in proximity to the ground surface and each discharging a downward flow of air to support continued combustion of material ignited by said burners,
  a source of pressurized air carried by the framework continuously supplying said air conduits,
  an exhaust fan discharging air from the enclosed framework to the atmosphere and producing a below atmospheric pressure within said framework, and
  barrier means disposed interiorly of the enclosed framework and defining a combustion chamber therebelow, said barrier means acting on the upward flow of the products of combustion causing same to follow a circuitous path terminating in an exhaust chamber for exhausting by said fan whereby substantially total combustion of said products is achieved prior to discharge to the atmosphere.

2. The mobile burning apparatus claimed in claim 1 additionally including a double walled exhaust stack for the exhaust fan, said stack having openings therein for the entry of a cooling airflow for passage intermediate the double walls, means mounting said stack to the roof of the apparatus in a removable manner whereby the stack may be relocated on the apparatus to reduce apparatus height for road travel.

3. The mobile burning apparatus claimed in claim 2 additionally including track means extending rearwardly along the apparatus roof structure for conveying of the stack towards a stowed position.

4. The mobile burning apparatus as claimed in claim 1 wherein said air conduits are in open communication at their ends with frame members of the apparatus framework, said frame members adapted to receive a pressurized air-flow from said pressurized air source for routing to said conduits.

5. The mobile burning apparatus claimed in claim 4 wherein said skirt means is in hinged attachment with said framework, said skirt means further including pairs of upper and lower skirt plates hingedly interconnected to facilitate the lowermost edge of the lower skirt plate traveling in resting contact with the ground regardless of irregular ground surfaces.

6. The mobile burning apparatus as claimed in claim 1 wherein said barrier means has a plurality of openings along its uppermost surface for the addition of ambient air into the exhaust chamber for cooling purposes.

7. A mobile burning apparatus for the application of heat to vegetable matter and the adjacent ground surface, said apparatus comprising,
  a framework of box-like configuration supported by rubber-tired wheels for both field and road travel, at least some of said wheels being steerable, said framework including longitudinal frame members some of which additionally serve to convey an airflow from a source of pressurized air,
  wall and roof structures enclosing the framework, said wall structures having open areas therein in communication with the atmosphere and with the interior of the apparatus for the wall cooling passage of ambient air into the apparatus, refractory material within the wall and roof structures,
  multiple burners disposed forwardly within said framework with a flame pattern extending into proximity of the ground surface for igniting the vegetable matter,
  skirt means depending from said framework into ground contact confining combustion within the framework and restricting entry of ambient air into the apparatus, said skirt means including hingedly interconnected members yieldably carried by the framework to accommodate terrain variances,
  air conduits in open communication with and extending intermediate said longitudinal frame members of the framework in a horizontal manner and having elongate nozzles for discharging an airflow downwardly to support combustion of the vegetable matter ignited by said burners,
  a source of pressurized air carried by the framework and supplying said frame members and said conduits,
  an exhaust fan discharging air from the interior of the enclosed framework to the atmosphere resulting in a below atmospheric pressure within said enclosed framework, and
  barrier means disposed in a substantially level manner intermediate the frameworks wall structures and spaced above the ground surface to define a subjacent combustion chamber and a superjacent exhaust chamber, said barrier means having a refractory surface covering diverting the upward flow of the products of combustion causing same to follow a circuitous path terminating in the exhaust chamber for exhausting by said fan whereby substantially total combustion of said products is achieved prior to discharge to the atmosphere.

8. The mobile burning apparatus as claimed in claim 7 additionally including a segmented exhaust stack of double wall construction for the exhaust fan, said stack having openings for the entry of a cooling airflow for passage intermediate the double walls, means mounting said stack to the roof of the apparatus in a removable manner whereby the stack may be relocated on the apparatus to reduce apparatus height for road travel, said exhaust fan having blades of hollow construction in communication at their innermost ends with a source of air for passage lengthwise within the blades for cooling same.

9. The mobile burning apparatus as claimed in claim 8 additionally including track means extending rearwardly along the apparatus roof structure, track extensions swingably mounted to one end wall of the apparatus to receive and lower said stack.

10. The mobile burning apparatus as claimed in claim 7 wherein said conduits have internal reinforcing members which additionally dissipate conduit heat to the conduit airflow.

11. The mobile burning apparatus as claimed in claim 7 wherein said skirt means is in hinged attachment with said framework, said skirt means further including pairs of segmented upper and lower skirt plates hingedly interconnected to permit the lowermost edge of the lower skirt plate to travel in resting contact with the ground regardless of irregular ground surfaces.

12. The mobile burning apparatus as claimed in claim 7 wherein said barrier means has a plurablity of openings along its uppermost surface for the addition of ambient air into the exhaust chamber for cooling purposes.

13. In a wheel supported field burning apparatus having an enclosed framework having lower longitudinal frame members, an exhaust fan carried by said framework and exhausting products of combustion therefrom, burners mounted on said framework for igniting field vegetable matter, means depending from the framework and contactable with the ground surface to confine combustion within said framework, a source of pressurized air carried by the framework, the improvement comprising; a series of air conduits supported intermediate the lower longitudinal frame members of the enclosed framework and in communication with said source, said conduits in close proximity to the ground surface and having air nozzles extending therealong for the downward discharge of pressurized air from said source to support combustion of the burner-ignited vegetable matter.

14. The invention as claimed in claim 13 wherein said air conduits are in open communication with and extend intermediate said longitudinal frame members of the apparatus framework, said frame members receiving a pressurized flow of air from said source.

15. The invention as claimed in claim 14 wherein said conduits have internal reinforcing members which additionally dissipate conduit heat to the conduit airflow.

16. The invention as claimed in claim 14 additionally including barrier means disposed substantially level within the enclosed framework and defining a combustion chamber therebelow, said barrier means diverting the upward flow of the products of combustion causing same to follow a circuitous path terminating in an exhaust chamber above the barrier for exhausting by said fan whereby substantially total combustion of said products is achieved prior to discharge to the atmosphere.

17. The invention as claimed in claim 16 wherein said barrier means has a plurality of openings along its uppermost surface for the addition of ambient air for cooling purposes.

* * * * *